(12) United States Patent
Feuillette

(10) Patent No.: US 9,578,594 B2
(45) Date of Patent: *Feb. 21, 2017

(54) MANAGING CONTEXTUAL INFORMATION FOR WIRELESS COMMUNICATIONS

(71) Applicant: LG ELECTRONICS INC., Seoul (KR)

(72) Inventor: Remi Feuillette, Paris (FR)

(73) Assignee: LG Electronics Inc., Seoul (KR)

( * ) Notice: Subject to any disclaimer, the term of this patent is extended or adjusted under 35 U.S.C. 154(b) by 108 days.

This patent is subject to a terminal disclaimer.

(21) Appl. No.: 14/548,113

(22) Filed: Nov. 19, 2014

(65) Prior Publication Data

US 2015/0156703 A1 Jun. 4, 2015

Related U.S. Application Data

(63) Continuation of application No. 12/441,459, filed as application No. PCT/KR2007/004953 on Oct. 10, 2007, now Pat. No. 8,917,630.

(60) Provisional application No. 60/893,000, filed on Mar. 5, 2007, provisional application No. 60/850,661, filed on Oct. 11, 2006.

(51) Int. Cl.

| | | |
|---|---|---|
| *H04L 12/28* | (2006.01) | |
| *H04W 48/02* | (2009.01) | |
| *H04L 12/24* | (2006.01) | |
| *H04L 12/701* | (2013.01) | |
| *H04W 8/18* | (2009.01) | |
| *H04L 29/08* | (2006.01) | |
| *H04W 48/16* | (2009.01) | |

(52) U.S. Cl.

CPC ............ *H04W 48/02* (2013.01); *H04L 41/082* (2013.01); *H04L 41/0869* (2013.01); *H04L 45/00* (2013.01); *H04L 67/306* (2013.01); *H04W 8/18* (2013.01); *H04W 48/16* (2013.01)

(58) Field of Classification Search

CPC ........ H04W 8/18; H04W 48/02; H04W 48/16; H04L 67/30; H04L 67/303; H04L 67/306; H04L 41/085; H04L 41/0853; H04L 41/0866

See application file for complete search history.

(56) References Cited

U.S. PATENT DOCUMENTS

| | | |
|---|---|---|
| 6,711,141 B1 | 3/2004 | Rinne et al. |
| 6,901,261 B2 | 5/2005 | Banatre et al. |
| 2004/0098715 A1* | 5/2004 | Aghera ............ G06F 8/65 717/173 |
| 2005/0148365 A1 | 7/2005 | Lee |
| 2005/0198247 A1* | 9/2005 | Perry ............ H04L 7/0008 709/223 |
| 2006/0073788 A1 | 4/2006 | Halkka et al. |

(Continued)

*Primary Examiner* — Kan Yuen
(74) *Attorney, Agent, or Firm* — Birch, Stewart, Kolasch & Birch, LLP

(57) ABSTRACT

Contextual information for wireless communications is managed in terms of management objects (MO) using device management (DM) protocol. Contextual information management is performed by determining a need to change from an old configuration to a new configuration, retrieving profile information necessary to make a decision about the new configuration, and making a decision about the new configuration based upon the retrieved profile information. The new configuration may include information about access technology and changes in one or more defined profiles.

18 Claims, 12 Drawing Sheets

(56) References Cited

U.S. PATENT DOCUMENTS

2006/0217113 A1    9/2006   Rao et al.
2007/0201366 A1    8/2007   Liu
2007/0254659 A1   11/2007   Paul et al.
2007/0259633 A1   11/2007   Rao
2008/0095067 A1    4/2008   Rao
2008/0220759 A1    9/2008   Norrman

* cited by examiner

MANAGING CONTEXTUAL INFORMATION FOR WIRELESS COMMUNICATIONS

This application is a Continuation of copending application Ser. No. 12/441,459, filed on Mar. 16, 2009, which was filed as the National Stage of PCT International Application No. PCT/KR2007/004953, on Oct. 10, 2007, which claims the benefit under 35 U.S.C. §119(e) to U.S. Provisional Application Nos. 60/850,661, filed Oct. 11, 2006 and 60/893,000, filed on Mar. 5, 2007, respectively, all of which are hereby expressly incorporated by reference into the present application.

BACKGROUND ART

The present invention relates to managing contextual information for wireless communications. Contextual information may refer to information related to radio access technologies, terminal capabilities, user preferences, applications and/or services provided on the terminal, and the like. Such contextual information needs to be managed and handled effectively and efficiently. However, the related art technologies do not sufficiently address such issues, and thus do not offer appropriate solutions

DISCLOSURE OF INVENTION

Technical Solution

The present inventor recognized at least the above-identified drawbacks of the related art. Based upon such recognition, the various features described hereafter have been conceived such that contextual information is managed in terms of management object (MO) using device management (DM) protocol support.

MODE FOR THE INVENTION

Figure 1:
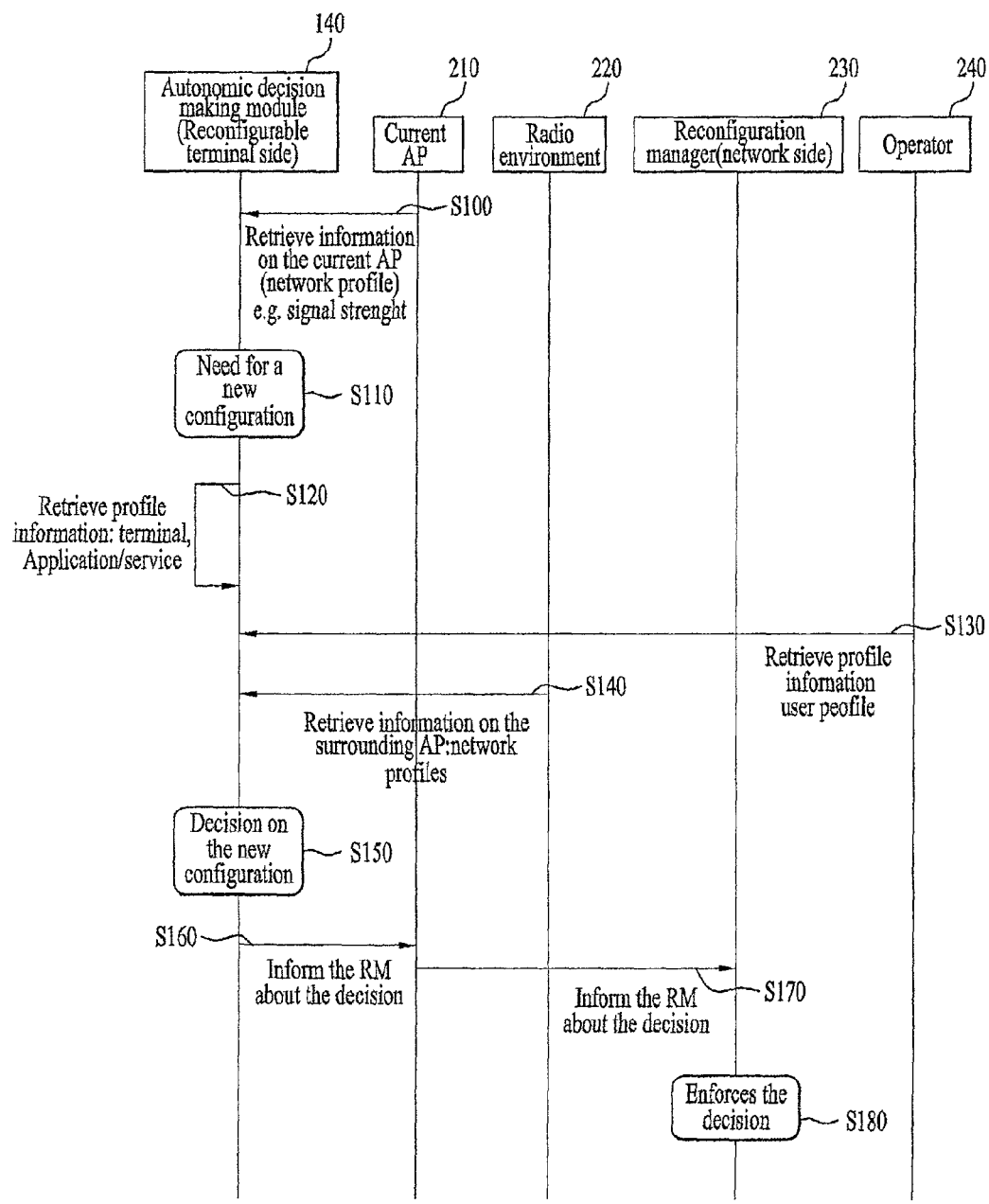
FIG. 1 shows a signal flow diagram for an exemplary method of managing contextual information for wireless communications according to the present invention.

The inventive concepts and features herein related to managing contextual information for wireless communications are explained in terms of device management (DM) techniques. However, such details are not meant to limit the various features described herein, which are applicable to other types of information management techniques.

Hereafter, the term "terminal" will be used to refer to various types of user devices, such as mobile communication terminals, user equipment (UE), mobile equipment (ME), and other devices that support various types of wireless communication technologies.

Certain concepts described herein are related to the so-called E2R (End-to-End Re-configurability) project, which is an integrated project of the 6th Framework Programme of the European Commission, that addresses the core strategic objective of "Mobile and wireless systems and platforms beyond 3G" to provide a true seamless experience to the user based on end-to-end connectivity.

The present invention relates to managing contextual information that needs to be managed and handled effectively and efficiently.

Contextual information may be managed in terms of management objects (MO or MOs) using device management (DM) protocol support. Some examples of contextual information may be provided in so-called "profiles" (i.e., types or categories of information) that present a definition of capabilities, which allow accurate provisioning of various types of wireless communication services, such as reconfiguration services.

For example, contextual information may include the surrounding radio access technologies (RAT), terminal capabilities, user preferences, applications/services provided on the terminal, and the like.

Such contextual information may be represented as a logical hierarchical structure, such as a device management (DM) tree using extendible mark-up language (XML).

The profiles may include (but are not limited to) a user profile, a terminal profile, a service (or application) profile, and a network profile.

The profiles may include (but are not limited to) a user profile, a terminal profile, a service (or application) profile, and a network profile.

The information provided by the terminal profile may be related to (but are not limited to) the physical and technological capabilities of the terminal, such as a processing unit (CPU), a memory, a battery, and other aspects about the terminal.

The information provided by the service (and/or application) profile may be related to (but are not limited to) software components (i.e., codes, instructions, etc.) for the terminal, such as the operating system (OS), deployed applications (i.e., ID, name, version, update URL, QoS preference, etc.), delivered applications, and other aspects about various services and/or applications.

The information provided by the network profile may be related to (but are not limited to) the available radio access technologies (RAT), the network access point (NAP) ID, signal strength, bearer type, carrier frequency, cell ID, and other aspects about various network characteristics.

Clearly, additional and/or alternative types of profiles may be provided, as the above-mentioned profiles are merely exemplary. For example, a security profile may be used for providing certain aspects about various network-related and/or user-related security characteristics, such as security keys and the like.

In the context of the E2R project, several profiles have been defined: terminal profile, user profile, network profile, application and service profile, and security profile.

The present invention proposes a list of the different profile contents that are constituted by five (or more) management objects (MOs), which would allow an external entity to retrieve and manage the profile information remotely.

Much work has been done by different standardization bodies on user profiles (GUP, UCI, etc.). However, those standards only address the problem of how the profile information should be represented and handled, and do not list the contents of each profile.

Reconfiguration may refer to a process of optimizing various parameters (or other factors) related to wireless communications. Such parameters may be initially con Figured (or set) and then later con Figured again (i.e., recon Figured) as necessary.

Additionally, reconfiguration may refer to the process of changing the behavior of a system. It is carried out by the addition or the exchange of executable code, which defines the logic of the system, and/or by the modification of operational parameters of the system. Reconfiguration can cover the switch from one predefined configuration to another one, as well as the installation of new functionality that was not available in the device before.

This invention proposes a particular structure and specific contents of the different profiles, and explains how a distributed approach for managing such profiles would work. This invention also proposes and defines several management objects (MOs) in order to present (or provide) the information to a network entity (such as a DM server).

A list of the different profile contents (for example, four or five types of MOs) is provided, which would allow an external entity (such as a DM server) to retrieve and manage the profile information in a remote manner.

FIG. 1 shows a signal flow diagram for an exemplary method of managing contextual information for wireless communications according to the present invention.

In general, the procedures of determining a need for reconfiguration, gathering profile information, and obtaining a decision about how to perform the reconfiguration are performed.

More particularly, a method of managing contextual information for wireless communications, may comprise the steps of: determining a need to change from an old (first) configuration to a new (second) configuration (S110); retrieving profile information necessary to make a decision about the second configuration (S120); and making a decision about the second configuration based upon the retrieved profile information in order to manage contextual information for wireless communications (S150), wherein the second configuration includes information about access technology and changes in one or more defined profiles.

In such method, the second configuration may be related to radio access technologies. The determining step may be based upon access point connectivity information. The access point connectivity information may be retrieved from a network profile. The profile information may comprise at least one of a terminal profile, a service profile, a network profile, and a user profile. The terminal profile may relate to capabilities of the terminal. One or more profiles may be established as management objects (MOs) in a management object (MO) tree structure. The management objects (MOs) may be retrieved or modified by a server using device management (DM) protocol support. The access technology may relate to at least one of 3GPP, OMA, IEEE, and ETSI standards.

Additionally, a method of managing contextual information for wireless communications may comprise determining a need to change from a first (old) configuration to a second (new) configuration (S100); validating a decision made by a terminal about the second configuration (S130, S140, S160, S170); and adapting the second configuration in order to manage contextual information for wireless communications (S180), wherein the second configuration includes information about access technology and changes in one or more defined profiles.

The determining step may be performed by retrieving information of a current access point that is stored in a network profile. The method may further comprise a step of sending a request to retrieve information of a user profile and a network profile before performing the validating step. The validating step may be performed by receiving information about the decision made by the terminal about the new configuration.

Figure 2:
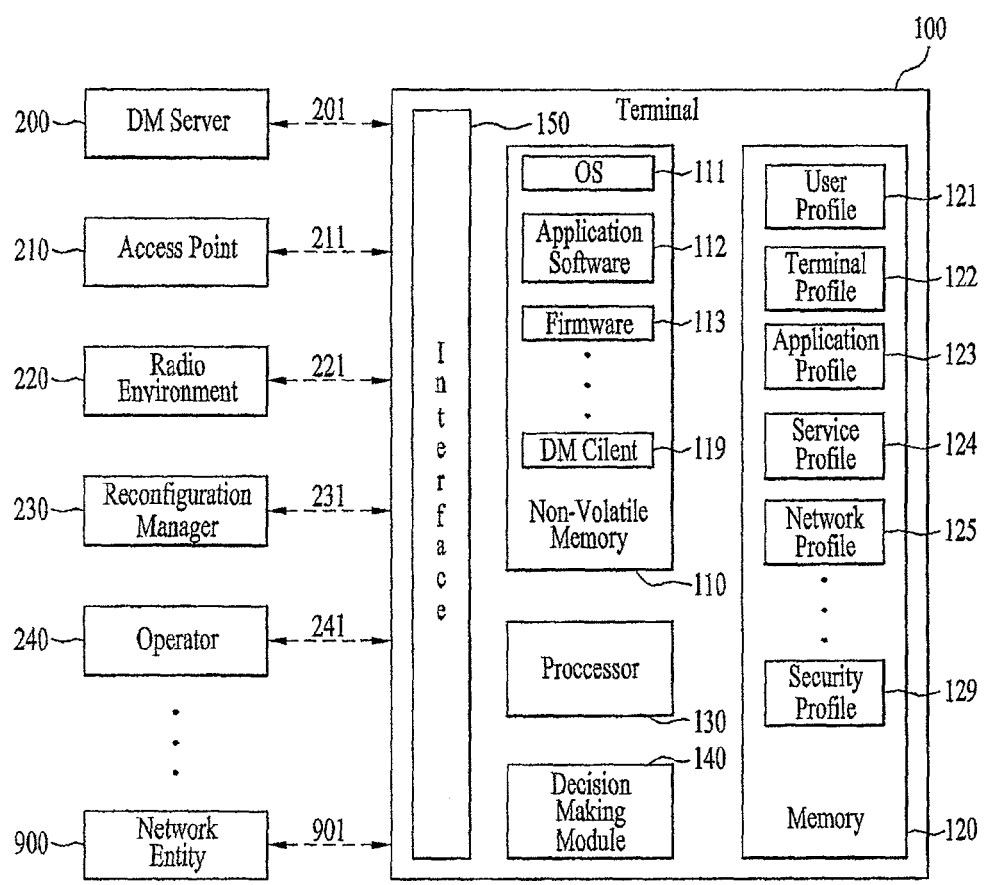
FIG. 2 shows an exemplary structure of a terminal cooperating with network elements to implement an exemplary method of managing contextual information for wireless communications according to the present invention.

FIG. 2 shows an exemplary structure of a terminal cooperating with network elements to implement an exemplary method of managing contextual information for wireless communications according to the present invention.

For example, a terminal 100 for managing contextual information for wireless communications with a network, may comprise a memory 120 to store management objects related to contextual information for wireless communications in the form of a management object tree structure; an interface 150 to receive from a network server, a request for providing management objects related to the contextual information; and a processor 130 to provide the management object tree structure to the network server via the interface. The terminal 100 may also include a decision making module 140. The interface 150 may interface the terminal 100 to the following entities: decision making server 200 via interface 201; access point 210 via interface 211; radio environment 220 via interface 221; reconfiguration manager 230 via interface 231; operator 240 via interface 241; and network entity 900 via interface 901.

In such terminal 100, the processor 130, in cooperation with the memory 120 and the interface 150, can make a decision to attach to the network.

The memory 120 may comprise profiles containing information related to user preferences, the terminal, the network, and applications/services supported by the terminal and the network.

The profiles may comprise: a user profile 121 that at least specifies privacy settings and preferences; a terminal profile 122 that at least specifies memory allocation, allows a service provider to gain access, and that allows the management object tree structure to be extended for each new service provider; an application/service profile 123/124 that at least specifies quality of service parameters; and a network profile 125 that at least specifies bearer service parameters.

The profiles may further comprise a security profile 129 that at least specifies security parameters.

Such terminal 100 may further comprise: a non-volatile memory 110, that is accessed by the processor 130, to store information related to at least one of an operating system 111, application software 112, firmware 113, and a device management client 119 to allow management of the contextual information for wireless communications.

Figure 3:
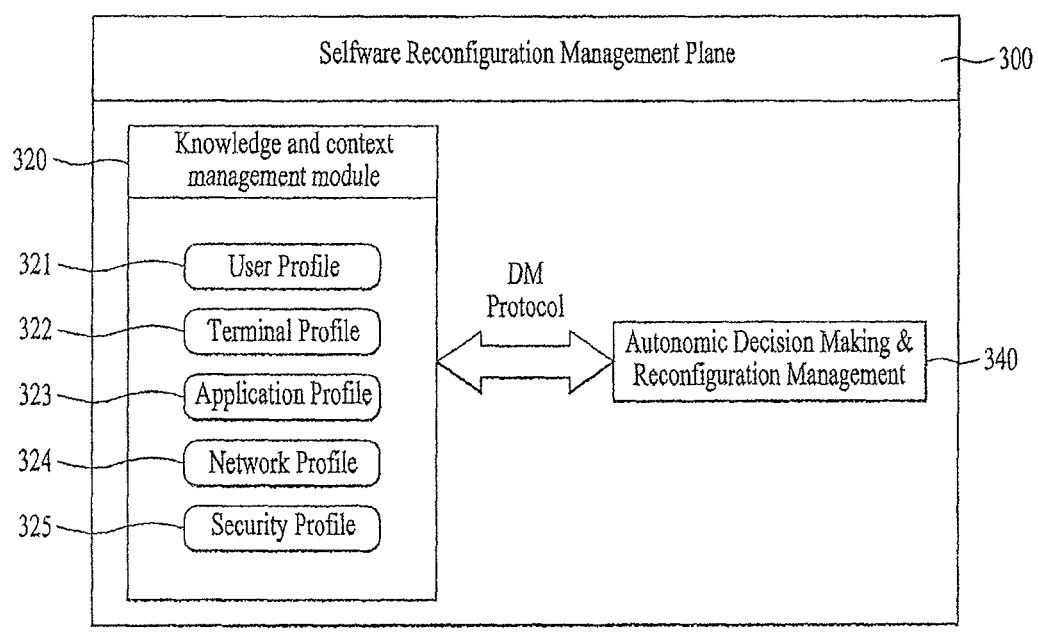
FIG. 3 shows an example of how a DM protocol can be used to support the various profile management concepts of the present invention.
Figure 4:
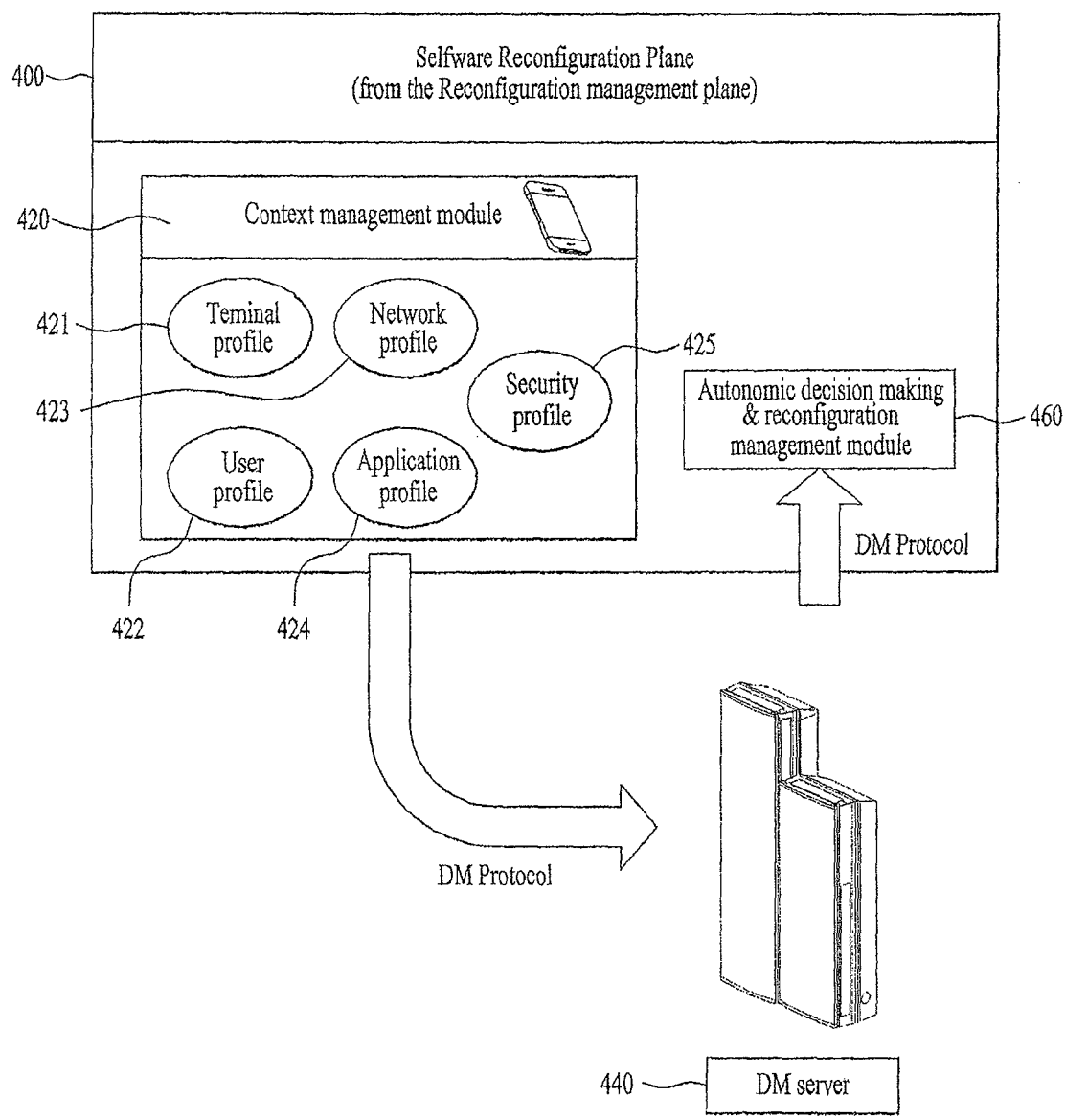
FIG. 4 shows another example of how a DM protocol can be used to support the various profile management concepts of the present invention.

FIGS. 3 and 4 show some examples of how a DM protocol can be used to support the various profile management concepts of the present invention.

Namely, the concepts described above may be implemented in an E2R system architecture that supports the features of the present invention may be defined in the entity called a Reconfiguration Management Plane, and more specifically in the Selfware Reconfiguration Plane (SRP).

An exemplary use case may be for a heterogeneous radio environment (for example, GSM, UMTS and Wi-Fi), wherein the terminal is able to recon Figure itself to access the best suited access technology, depending on criteria such as: user preferences, device capabilities, quality of the network, application in use, and other additional policy rules defined by the network.

FIG. 3 shows a terminal for managing contextual information for wireless communications with a network. The terminal may comprise a selfware reconfiguration management plane (300) having a context management module (320) and a reconfiguration management module (340), where the context management module 320 contains contextual information stored within profiles (e.g., user profile 321, terminal profile 322, application profile 323, network profile 324 and security profile 325) in the form of management objects, and whereby a device management (DM) protocol facilitates the managing of the contextual information with the reconfiguration management module.

FIG. 4 shows a system for managing contextual information for wireless communications with a terminal. The system may comprise a selfware reconfiguration management plane (400) having a context management module (420) and a contains management module (460), where the context management module 420 contains contextual information stored within profiles (e.g., terminal profile 421, user profile 422, network profile 423, application profile 424 and security profile 425) in the form of management objects, and whereby a network server (440) supporting a device management (DM) protocol facilitates the managing of the contextual information with the reconfiguration management module.

FIGS. 5 through 8 respectively show some exemplary management objects (MO) in the form of nodes in a logical hierarchy (tree) structure for a User Profile, a Terminal Profile, an Application/Service Profile, and a Network Profile.

FIGS. 9 through 12 respectively show some other exemplary management objects (MO) in the form of nodes in a logical hierarchy (tree) structure for a User Profile, a Terminal Profile, an Application/Service Profile, and a Network Profile.

Referring to FIGS. 5 through 12, a management object (MO) logical hierarchy structure used in managing contextual information for wireless communications between a network and a terminal, may comprise: a first hierarchy including at least one of a first node and a second node that contain contextual information that specify characteristics used for setting reconfiguration values; and a second hierarchy including sub-nodes under the first node related to a first characteristic for reconfiguration, and sub-nodes under the second node related to a second characteristic for reconfiguration.

In such logical hierarchy structure, at least one node in the first hierarchy may be newly added and/or modified depending on a type of profile when changing from a first configuration to a second configuration.

Also, at least one sub-node in the second hierarchy may be newly added and/or modified depending on a type of profile when changing from a first configuration to a second configuration.

For the User Profile, the first and second hierarchies are related to a user profile. The first node is a user preference node and the second node is a user privacy setting node. The sub-nodes under the user preference node are related to at least one of language, update settings, preferred memory, access technologies, service provider, and quality of service (QoS). The sub-nodes under the user privacy node are related to at least one of positioning and availability.

For the Terminal Profile, the first and second hierarchies are related to a terminal profile. The first node is a device memory node. The sub-nodes under the device memory node are related to at least one of information regarding device memories available for use in the terminal, and information regarding device memories which use is restricted for the terminal.

For the Application/Service Profile, the first and second hierarchies are related to an application/services profile. The first node is a deployed applications node and the second node is a delivered applications node. The sub-nodes under the deployed applications node are related to at least one of information regarding a quality of service of each application.

For the Network Profile, the first and second hierarchies are related to a network profile. The first node is a bearer service node. The sub-nodes under the bearer service node are related to at least one of traffic class, maximum bit rate, guaranteed bit rate, and transfer delay.

For the Security profile, the first and second hierarchies are related to a security profile. At least one of the first node, the second node, and the sub-nodes are related to at least one of user authentication, user authorization, and user verification.

Referring to FIGS. 5 through 8, some examples of the different proposed profile MOs (User Profile, Terminal Profile, Application/Service Profile, Network Profile and Security Profile) may be as follows:

Here, it should be noted that each parameter in each profile would have additional details: an Occurrence, a Format, an Access Type, and Values. For example, the interior node/<X>: may have Occurrence: One, Format: Node, Access Type: Get, and Values: N/A. However, these details have not been specified for each parameter merely for the sake of brevity, but would be clearly understood by those skilled in the art.

(1) User Profile

Figure 5:
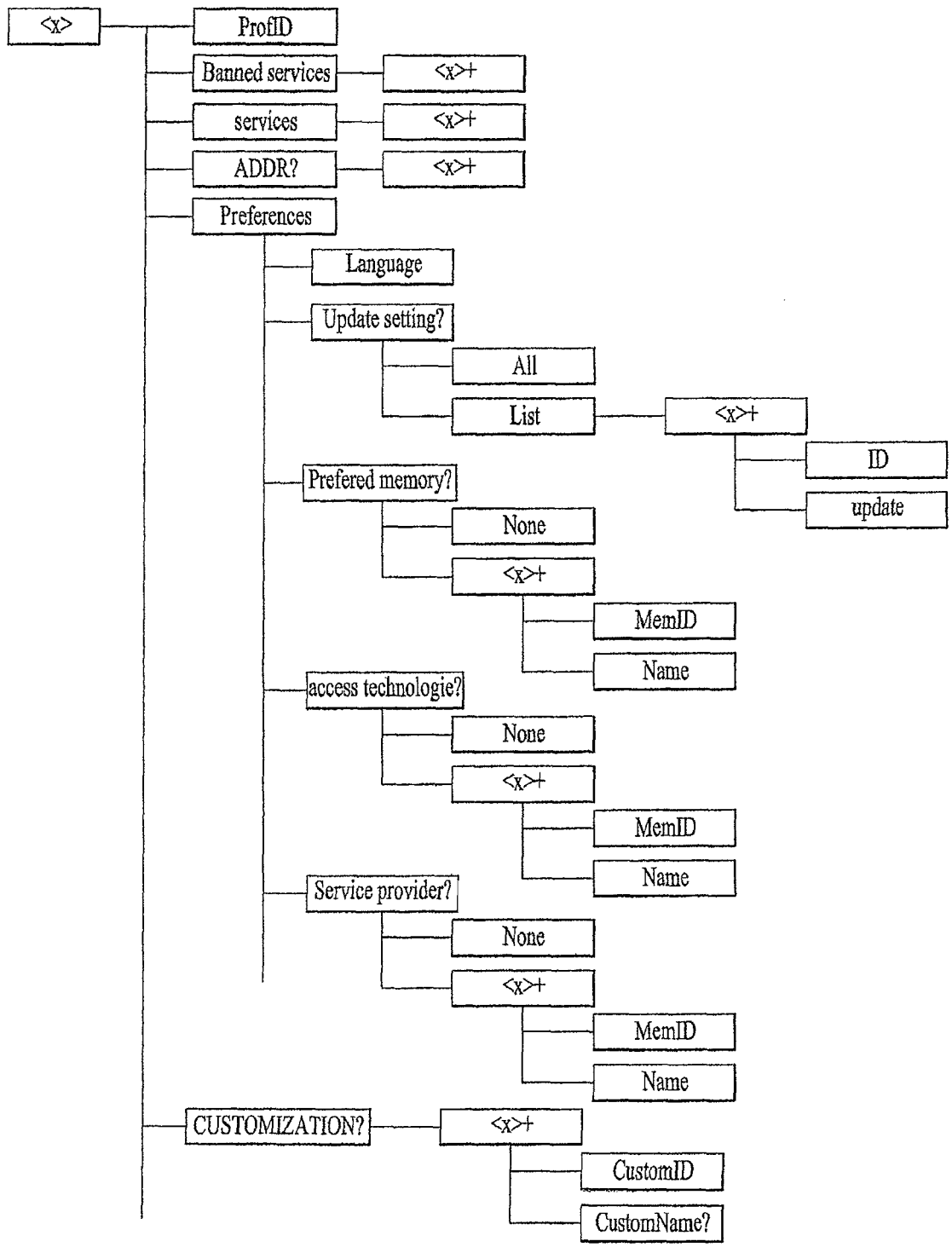
FIG. 5 shows an example of User Profile management objects (MO in the form of modes in a logical hierarchy (tree) structure.

FIG. 5 shows some exemplary parameters for a User Profile, and each node can be described as follows:

/<X>:

This interior node acts as a placeholder for the information regarding the user preferences and subscription /<X>/ProfID This leaf node specifies the human readable name. It indicates the ID of the profile, in order that a user can define and use several profiles.

/<X>/BANNEDSERVICES
   This interior node acts as a placeholder for the information regarding the services which use is restricted for the user.
   /<X>/BANNEDSERVICES/<x>
   This interior node specifies the service ID of the banned/restricted service.
   /<X>/SERVICES
   This interior node acts as a placeholder for the information regarding the services the user has subscribed to.
   /<X>/SERVICES/<x>
   This interior node specifies the ID of the service subscribed by the user
   /<X>/ADDR
   This interior node acts as a placeholder for all the addresses the user can have (e.g. IMSI, URI, SIP . . . )
   /<X>/ADDR/<x>
   This interior node acts as a placeholder for all the addresses the user can have (e.g. IMSI, URI, SIP, e-mail . . . ). It specifies the addresses of the user with a human readable name.
   /<X>/PREFERENCES
   This interior node acts as a placeholder for the information regarding all the user set information.
   /<X>/PREFERENCES/LANGUAGE
   This leaf node specifies the language chosen by the user for the applications
   /<X>/PREFERENCES/UPDATESETTING
   This interior Node acts as a placeholder for the information regarding the update of the software present in the device, more specifically whether this update should be automatic, or should the user accept this update.
   /<X>/PREFERENCES/UPDATESETTING/ALL
   This leaf node specifies if all the software present in the device should be updated automatically, or after the agreement of the user. If this field contains the Boolean "true" then all the updates will be done automatically.
   /<X>/PREFERENCES/UPDATESETTING/List
   This interior Node acts as a placeholder for the information regarding the update of the software present on the device, more specifically whether this update should be automatic, or should the user accept this update, and this for each management authority (e.g. Microsoft applications, manufacturer applications . . . ).
   /<X>/PREFERENCES/UPDATESETTING/List/<x>
   This interior Node acts as a placeholder for the information regarding the update of the software present on the device, more specifically whether this update should be automatic, or should the user accept this update; and this for each management authority (e.g. Microsoft applications, manufacturer applications . . . ).
   /<X>/PREFERENCES/UPDATESETTING/List/<x>/ID
   This leaf node specifies the ID of the management authority for which update settings are set.
   /<X>/PREFERENCES/UPDATESETTING/List/<x>/update
   This leaf node specifies if the software present in the device should be updated automatically, or after the agreement of the user. If this field contains the Boolean "true" then all the updates will be done automatically.
   /<X>/PREFERENCES/PREFERREDMEMORY
   This interior node acts as a placeholder for the information about the preferred memories. There will be a rating between all the available memories: which one should be used first, then second . . . , for example, the user can choose between SIM card memory, device memory, memory stick . . . .
   /<X>/PREFERENCES/PREFERREDMEMORY/None
   This leaf node specifies if the user has any preference in the rating of the memories ("true") or not ("false") . . . .
   /<X>/PREFERENCES/PREFERREDMEMORY/<x>
   This interior node acts as a placeholder for the information regarding the rating of the different memories that can be used. The preference priority would be based on the naming of the x, so that the lowest value of <x> would mean higher priority. Therefore, in this case, it represents the rating of the described memory. The typical values of the names would be 1, 2 . . . n
   /<X>/PREFERENCES/PREFERREDMEMORY/<x>/MemID
   This leaf node specifies the memory ID
   /<X>/PREFERENCES/PREFERREDMEMORY/<x>/Name
   This leaf node specifies the human readable name defined for this memory
   /<X>/PREFERENCES/PREFERREDACCESSTECHNOLOGY
   This interior node acts as a placeholder for the information regarding the rating by the user of the different access technologies compliant with the device.
   /<X>/PREFERENCES/PREFERREDACCESSTECHNOLOGY/None
   This leaf node specifies if the user has any preference in the rating of the access technologies ("true") or not ("false") . . . .
   /<X>/PREFERENCES/PREFERREDACCESSTECHNOLOGY/<x>
   This interior node acts as a placeholder for the information regarding the rating of the different access technologies that can be used. The preference priority would be based on the naming of the x, so that the lowest value of <x> would mean higher priority. Therefore, in this case, it represents the rating of the described access technology. The typical values of the names would be 1, 2 . . . n
   /<X>/PREFERENCES/PREFERREDACCESSTECHNOLOGY/<x>/ID
   This leaf node specifies the access technology ID
   /<X>/PREFERENCES/PREFERREDACCESSTECHNOLOGY/<x>/Name
   This leaf node specifies the human readable name defined for this access technology
   /<X>/PREFERENCES/SERVICEPROVIDER
   This interior node acts as a placeholder for the information regarding the rating by the user of the different service provider that could be used
   /<X>/PREFERENCES/SERVICEPROVIDER/None
   This leaf node specifies if the user has any preference in the rating of the different service providers he could use ("true") or not ("false") . . . .
   /<X>/PREFERENCES/SERVICEPROVIDER/<x>
   This interior node acts as a placeholder for the information regarding the rating of the different service provider that can be used. The preference priority would be based on the naming of the x, so that the lowest value of <x> would mean higher priority. Therefore, in this case, it represents the rating of the described service provider. The typical values of the names would be 1, 2 . . . n
   /<X>/PREFERENCES/SERVICEPROVIDER/<x>/ID
   This leaf node specifies the service provider ID
   /<X>/PREFERENCES/PREFERREDACCESSTECHNOLOGY/<x>/Name
   This leaf node specifies the human readable name defined for this service provider

/<X>/CUSTOMIZATION

This interior node acts as a placeholder for all the information regarding the different customization schemes that have been defined (include ring-tones, custom menu, colors . . . ).

/<X>/CUSTOMIZATION/<x>

This interior node acts as a placeholder for all the information regarding the different customization schemes that have been defined (include ring-tones, custom menu, colors . . . ).

/<X>/CUSTOMIZATION/<x>/customID

This leaf node specifies the ID of the customization scheme.

/<X>/CUSTOMIZATION/<x>/customName

This leaf node specifies the human readable name of the customization scheme.

(2) Terminal Profile

Figure 6:
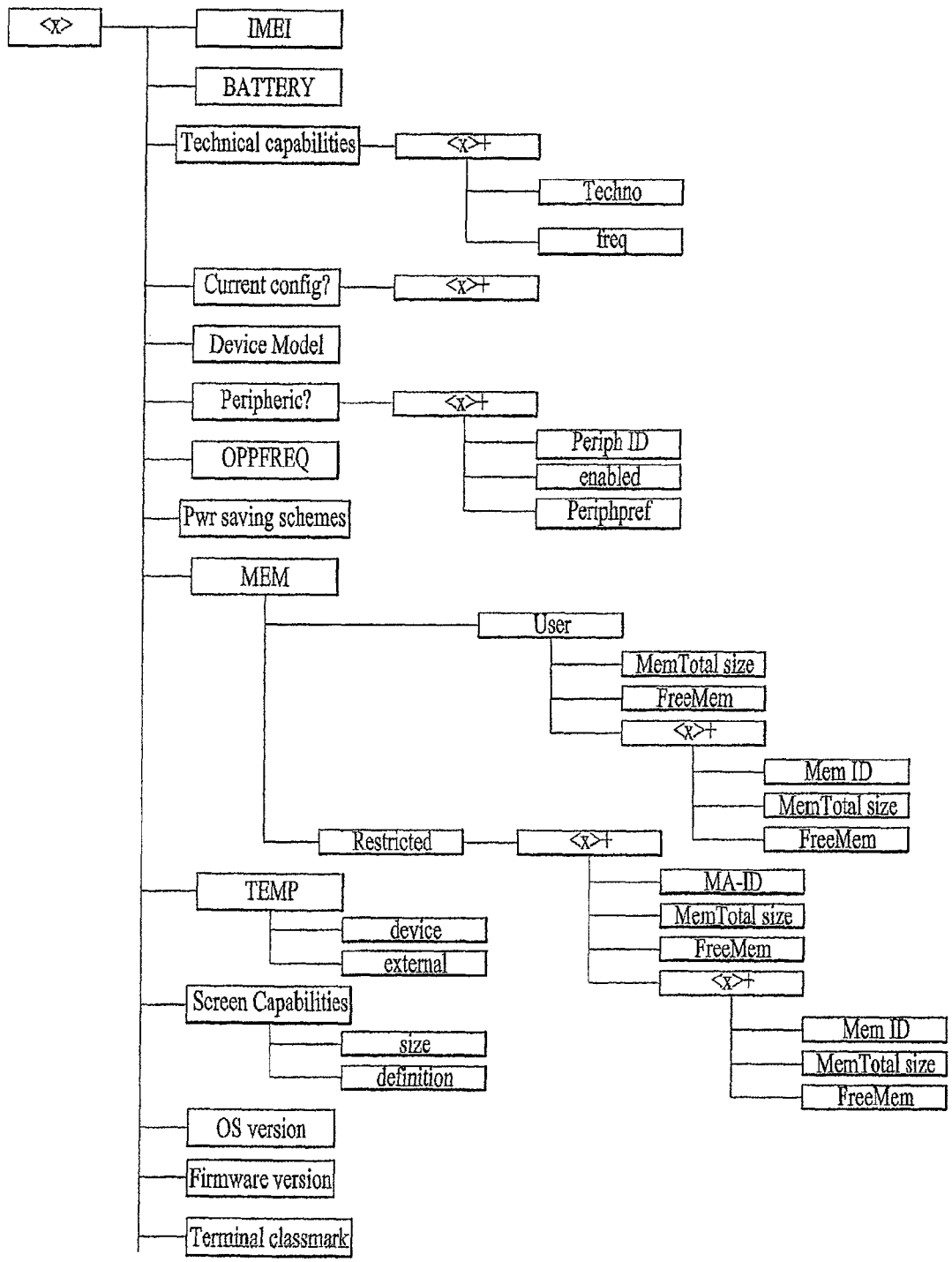
FIG. 6 shows an example of Terminal Profile management objects (MO) in the form of nodes in a logical hierarchy (tree structure).

FIG. 6 shows some exemplary parameters for a Terminal Profile, and each node can be described as follows:

/<X>/

This interior node acts as a placeholder for the information regarding the terminal in term of hardware.

/X>/IMEI

This leaf node specifies the IMEI number of the terminal

/<X>/BATTERY

This leaf node specifies the battery level of the device

/<X>/TECHCAPABILITIES

This interior node acts as a placeholder for all the information regarding the compliance with specific access technology.

/<X>/TECHCAPABILITIES/<x>

This interior node acts as a placeholder for all the information regarding the compliance with specific access technology, all the technologies compliant with the device will be listed under this node /<X>/TECHCAPABILITIES/<x>/techno This leaf node specifies the name of the technology (e.g. .GSM, UMTS, GPRS, Wi-Fi . . . )

/<X>/TECHCAPABILITIES/<x>/freq

This leaf node specifies the frequencies used for this technology

/<X>/CURRENTCONFIGURATION

This interior node acts as a placeholder for all the information regarding the protocol stacks loaded in the device /<X>/CURRENTCONFIGURATION/<x>

This interior node acts as a placeholder for all the information regarding the protocol stacks loaded in the device. It specifies the ID for each loaded protocol stack.

/<X>/DEVICEMODEL

This leaf node specifies the device model and version

/<X>/PERIPHERIC

This interior node acts as a placeholder for the information regarding the peripheries/accessories connected to the device /<X>/PERIPHERIC/<x>

This run-time node acts as a placeholder for each reference to a connected peripheric /<X>/PERIPHERIC/<x>/periphericID This leaf node specifies the peripheries/accessories connected to the device /<X>/PERIPHERIC/<x>/enabled This leaf node specifies if the peripheries/accessories is enabled with a Boolean (enabled if "true").

/<X>/PERIPHERIC/<x>/periphpref

This leaf node specifies the user profile that should be used when the periphery/accessory is connected to the device.

/<X>/OPFREQ

This leaf node specifies the frequency at which the terminal is operating

/<X>/POWERSAVINGSCHEMES

This leaf node specifies the power saving scheme used by device

/<X>/MEM

This interior node acts as a placeholder for the information regarding the device memories (free memory, total memory . . . ) for both the memory that the user can use and the memory reserved to the terminal, operator, and manufacturer.

/<X>/MEM/User

This interior node acts as a placeholder for the information regarding the device memories (free memory, total memory . . . ) that the user can use /<X>/MEM/User/memTotalSize This leaf Node specifies the total size of the memory /<X>/MEM/User/freeMem This leaf Node specifies the free space on the memory /<X>/MEM/User/<x>

This run-time node acts as a placeholder for the information regarding the device memories (free memory, total memory . . . )

/<X>/MEM/User/<x>/memID

This leaf Node specifies the memory ID

/<X>/MEM/User/<x>/memTotalSize

This leaf Node specifies the total size of the memory

/<X>/MEM/User/<x>/FreeMem

This leaf Node specifies the free space on the memory

/<X>/MEM/Restricted

This interior node acts as a placeholder for the information regarding the device memories (free memory, total memory . . . ) which use is restricted for the terminal, operator, manufacturer (e.g. OS, firmware . . . ) use. This node provides information about restricted memory for each management authority.

/<X>/MEM/Restricted/<x>

This interior node acts as a placeholder for the information regarding the device memories (free memory, total memory . . . ) which use is restricted for the terminal, operator, manufacturer (e.g. OS, firmware . . . ) use. This node provides information about restricted memory for each management authority.

/<X>/MEM/Restricted/<x>/MA_ID

This leaf Node specifies the ID of the management authority that has the right to use this memory.

/<X>/MEM/Restricted/<x>/memTotalSize

This leaf Node specifies the total size of the memory

/<X>/MEM/Restricted/<x>/freeMem

This leaf Node specifies the free space on the memory

/<X>/MEM/Restricted/<x>/<x>

This run-time node acts as a placeholder for the information regarding the device memories (free memory, total memory . . . )

/<X>/MEM/Restricted/<x>/<x>/memID

This leaf Node specifies the memory ID

/<X>/MEM/Restricted/<x>/<x>/memTotalSize

This leaf Node specifies the total size of the memory

/<X>/MEM/Restricted/<x>/<x>/FreeMem

This leaf Node specifies the free space on the memory

/<X>/TEMP

This internal node acts as a placeholder for information regarding the device temperature and the external temperature /<X>/TEMP/device
This leaf node specifies the device internal temperature
/<X>/TEMP/external
This leaf node specifies the external temperature
/<X>/SCREENCAPABILITIES
This interior node acts as a placeholder for information regarding the device screen capabilities such as size and definition
/<X>/SCREENCAPABILITIES/Size
This leaf node specifies the device screen size
/<X>/SCREENCAPABILITIES/Definition
This leaf node specifies the device screen definition
/<X>/OSVERSION
This leaf node specifies the version of the device OS
/<X>/FIRMWARE
This leaf node specifies the version of the installed firmware
/<X>/Terminal classmark
This leaf node specifies the classmark of the terminal. This classmark represent the terminal capabilities for reconfigurability: classmark 1 represent a non-reconfigurable equipment, classmark 2 represent a reconfigurable equipment, while classmark 3 represent a dynamically reconfigurable equipment.

(3) Application and Service Profile

Figure 7:
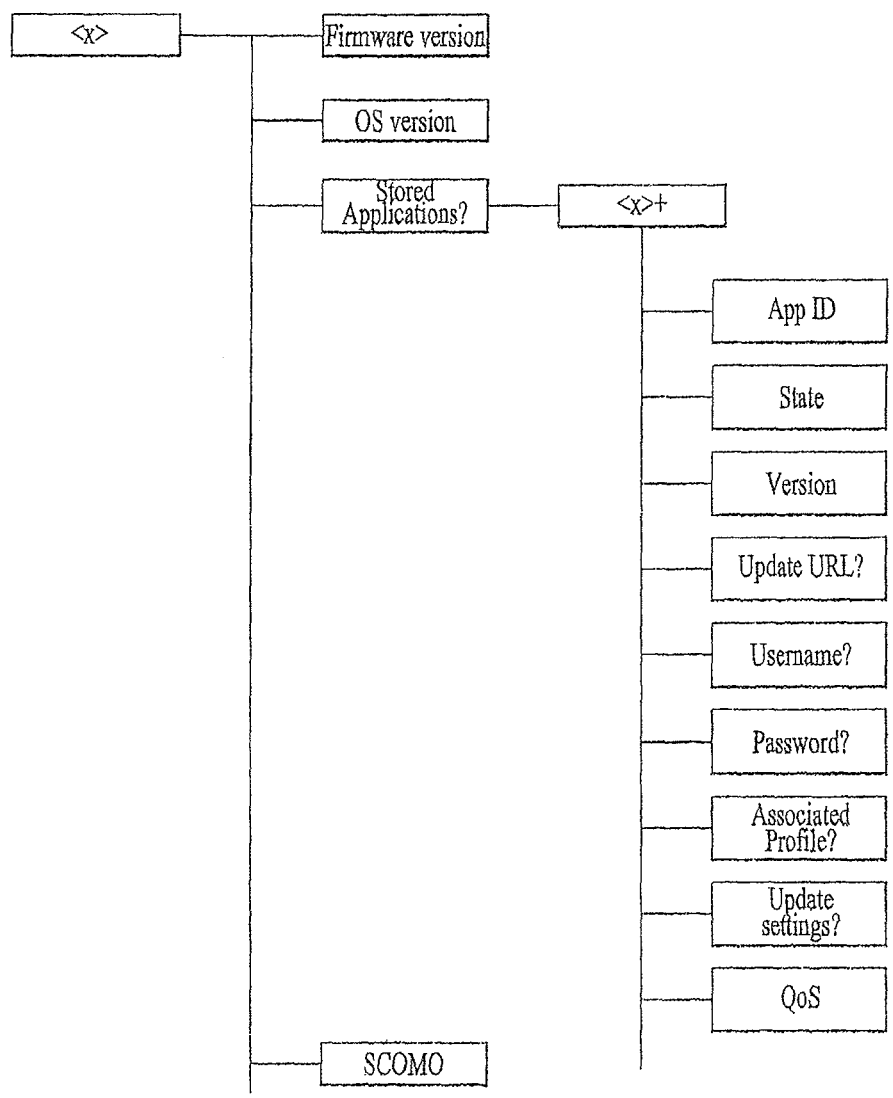
FIG. 7 shows an example of Application and Service Profile management objects (MO) in the form of nodes in a logical hierarchy (tree) structure.
Figure 8:
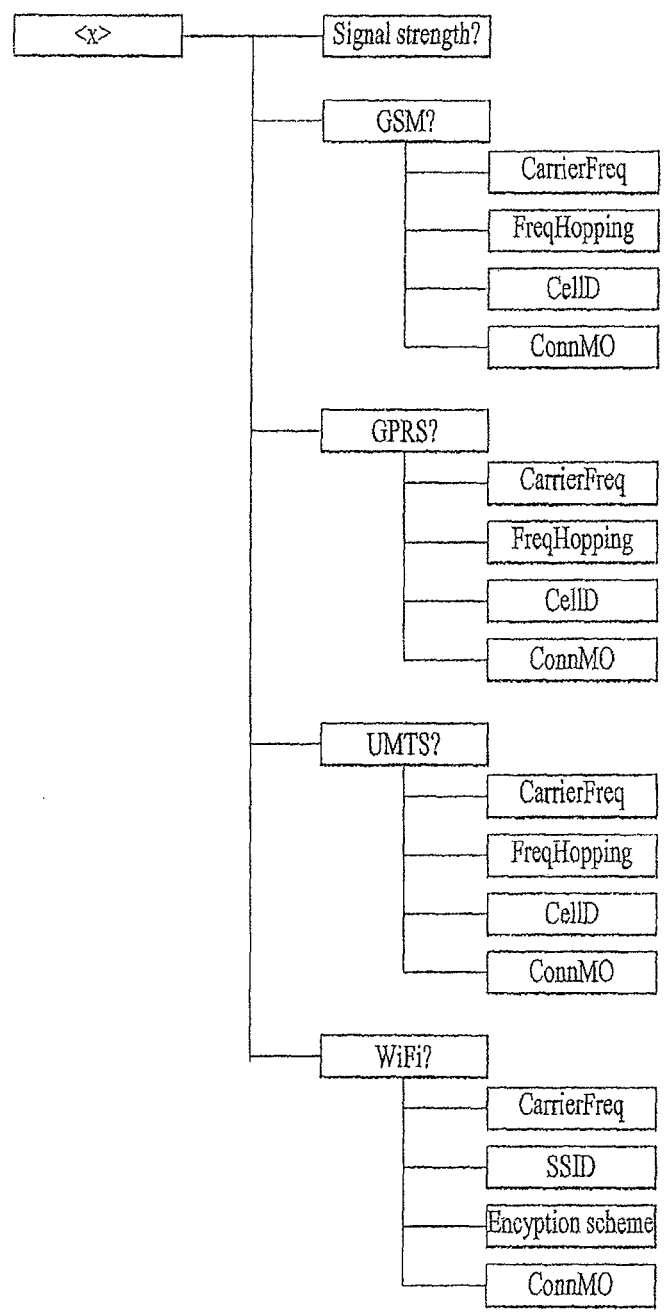
FIG. 8 shows an example of Network Profile management objects (MO) in the form of nodes in a logical hierarchy (tree) structure.

FIG. 7 shows some exemplary parameters for an Application/Service Profile, and each node can be described as follows:

/<X>/
This interior Node acts as a placeholder for the information regarding application and service profile.
/<X>/FIRMWAREVERSION
This leaf node specifies the version of the firmware loaded in the device
/<X>/OSVERSION
This leaf node specifies the version of the Operating system running on the device.
/<X>/APPLICATION/
This interior node acts as a placeholder for the information regarding all the applications stored in the terminal.
/<X>/APPLICATION/<x>
This interior node acts as a placeholder for the information regarding all the applications stored in the terminal.
/<X>/APPLICATION/<x>/ID
This leaf node specifies the application name
/<X>/APPLICATION/<x>/STATE
This leaf node specifies the whether the application is running or not.
/<X>/APPLICATION/<x>/VERSION
This leaf node specifies the application version
/<X>/APPLICATION/<x>/UPDATEURL
This leaf node specifies the URL where the application updates can be found
/<X>/APPLICATION x>/USERNAME
This leaf node specifies the user name used in for this application
/<X>/APPLICATION/<x>/PASSWD
This leaf node specifies the password used to run this application
/<X>/APPLICATION/<x>/QoS
This leaf node specifies the type of IP traffic used by the application, those types are: real-time (e.g. VoIP), non-real time traffic (e.g. Web browsing), and mission critical traffic (e.g. M-Commerce). Depending on the traffic type, the required QoS will change.
/<X>/APPLICATION/<x>ASSOCIATEDPROF
This leaf node specifies the user profile to be associated with this application
/<X>/APPLICATION/<x>UPDATESETTINGS
This leaf node specifies whether the download and install of new update should be done in an automatic fashion or asked to the user. This parameter is used only if in the user preference (defined in the user profile) the update setting is not set to "automatic". If it is, then the update of all the applications if available will be automatic.
/<X>/APPLICATION/<x>/SCOMO
This leaf node specifies the URI of the SCOMO node that include reference to the software component MO in the device (4) Network Profile FIG. 8 shows some exemplary parameters for a Network Profile, and each node can be described as follows:

/<X>/
This interior node acts as a placeholder for the information regarding the configuration of the device for the network.
/<X>/SIGNALSTRENGTH
This leaf node specifies the strength of the signal received by the device.
/<X>/CONNECTIVITYPARAMETERS
This interior Node acts as a placeholder for information regarding parameters of the network.
/<X>/CONNECTIVITYPARAMETERS/GPRS
This interior Node acts as a placeholder for information regarding GPRS
/<X>/CONNECTIVITYPARAMETERS/GPRS/Carrierfreq
This leaf Node specifies the carrier frequency that should be used to connect the terminal through GPRS
/<X>/CONNECTIVITYPARAMETERS/GPRS/CellID
This leaf Node specifies the ID of the cell to which the terminal is connected
/<X>/CONNECTIVITYPARAMETERS/GPRS/FreqHopping
This leaf Node specifies the frequency hopping list
/<X>/CONNECTIVITYPARAMETERS/GPRS/ConnMO
This leaf node specifies the URI of the ConnMO node that include reference to the NAP for this bearer in case this one already exists in the device
/<X>/CONNECTIVITYPARAMETERS/GSM
This interior Node acts as a placeholder for information regarding GPRS
/<X>/CONNECTIVITYPARAMETERS/GSM/Carrierfreq
This leaf Node specifies the carrier frequency that should be used to connect the terminal through GSM
/<X>/CONNECTIVITYPARAMETERS/GSM/FreqHopping
This leaf Node specifies the frequency hopping list
/<X>/CONNECTIVITYPARAMETERS/GSM/CellID
This leaf Node specifies the ID of the cell to which the terminal is connected
/<X>/CONNECTIVITYPARAMETERS/GSM/ConnMO
This leaf node specifies the URI of the ConnMO node that include reference to the NAP for this bearer in case this one already exists in the device
/<X>/CONNECTIVITYPARAMETERS/UMTS
This interior Node acts as a placeholder for information regarding GPRS /<X>/CONNECTIVITYPARAMETERS/UMTS/Carrierfreq This leaf Node specifies the carrier frequency that should be used to connect the terminal through UMTS /<X>/CONNECTIVITYPARAMETERS/UMTS/FreqHopping This leaf Node specifies the frequency hopping list /<X>/CONNECTIVITYPARAMETERS/UMTS/CellID This leaf Node specifies the ID of the cell to which the terminal is connected /<X>/CONNECTIVITYPARAMETERS/UMTS/ConnMO This leaf node specifies the URI of the ConnMO node that include reference about the NAP for this bearer in case it exists /<X>/CONNECTIVITYPARAMETERS/Wifi This interior Node acts as a placeholder for information regarding GPRS /<X>/CONNECTIVITYPARAMETERS/Wifi/Carrierfreq This leaf Node specifies the carrier frequency that should be used to connect the terminal through Wi-Fi /<X>/CONNECTIVITYPARAMETERS/Wifi/SSID This leaf Node specifies the SSID of the Wi-Fi network to which the terminal is connected /<X>/CONNECTIVITYPARAMETERS/Wifi/Encryption This leaf Node specifies the encryption scheme used to protect the Wi-Fi network /<X>/CONNECTIVITYPARAMETERS/WiFi/ConnMO This leaf node specifies the URI of the ConnMO node that include reference to the NAP for this bearer in case it exists.

(5) Security Profile

The description of an exemplary parameter for a Security Profile would be as follows:

/<X>/

This interior node acts as a placeholder for the information regarding security such as security keys, etc.

Additionally, referring to FIGS. 9 through 12, some more examples of the different proposed profile MOs (User Profile, Terminal Profile, Application/Service Profile, and Network Profile) are as follows:

Here, it should be noted that each parameter in each profile would have additional details: an Occurrence, a Format, an Access Type, and Values. For example, the interior node/<X>: may have Occurrence: One, Format: Node, Access Type: Get, and Values: N/A. However, these details have not been specified for each parameter merely for the sake of brevity, but would be clearly understood by those skilled in the art.

(6) Reconfigured User Profile

Figure 9:
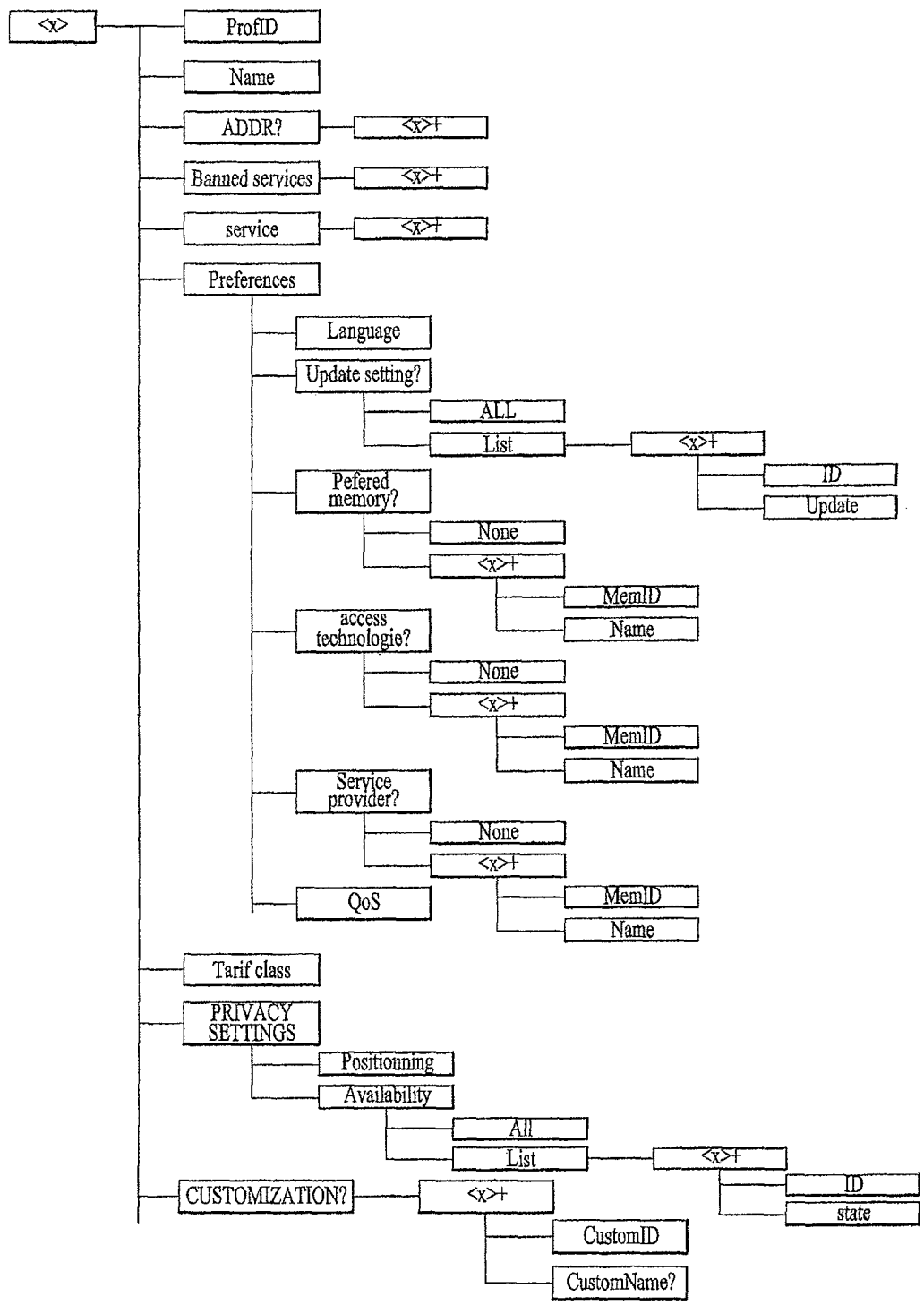
FIG. 9 shows another example of User Profile management objects (MO) in the form of notes in a logical hierarchy (tree) structure.

FIG. 9 (which shows some additional nodes compared to FIG. 5) shows some additional exemplary parameters for a User Profile, and each node can be described as follows (Note: Only those nodes not shown in FIG. 5 are described):

/<X>/Name

This leaf node specifies a human readable name, defined by the user, to facilitate service personalization /<X>/PREFERENCES/QoS This leaf node specifies the QoS the user would like to experience for his applications (e.g. a number from 1 to 5, 1 being the user doesn't care and 5 being the best)

/<X>/TarifClass

This leaf node specifies the charging scheme associated with the user. It represent the willingness of the user to pay for higher quality services, the user being classified in 3 categories (i.e. 3 charging schemes): Platinum, Silver, Gold.

/<X>/PRIVACYSETTINGS/

This interior node acts as a placeholder for all the information regarding the user's privacy /<X>/PRIVACYSETTINGS/Positioning This leaf node specifies whether the user wants to be located and/or tracked by the network for location-based service purposes. The value would be "true" in case the tacking is activated or "false" in case it is not.

/<X>/PRIVACYSETTINGS/Availability

This interior Node acts as a placeholder for the information regarding the availability of the user (e.g. available, busy, away . . . ). The user should be able to specify that on a per-service basis or on an overall basis.

/<X>/PRIVACYSETTINGS/Availability/ALL

This leaf node specifies if all the user's services should use the same value for availability, i.e. the value defined in this node. If the value is set to "available" (default value), then the user can define his availability on a per service basis /<X>/PRIVACYSETTINGS/Availability/List This interior Node acts as a placeholder for the information regarding the availability of the user (e.g. available, busy, away . . . ) on a per service basis.

/<X>/PRIVACYSETTINGS/Availability/List/<x>

This interior Node acts as a placeholder for the information regarding the availability of the user (e.g. available, busy, away . . . ) on a per service basis.

/<X>/PRIVACYSETTINGS/Availability/List/<x>/ID

This leaf node specifies the ID of the service for which the availability is set.

/<X>/PRIVACYSETTINGS/Availability/List/<x>/state

This leaf node specifies the availability value for the corresponding service. This value can be "available" or "busy" or "away"

(7) Reconfigured Terminal Profile

Figure 10:
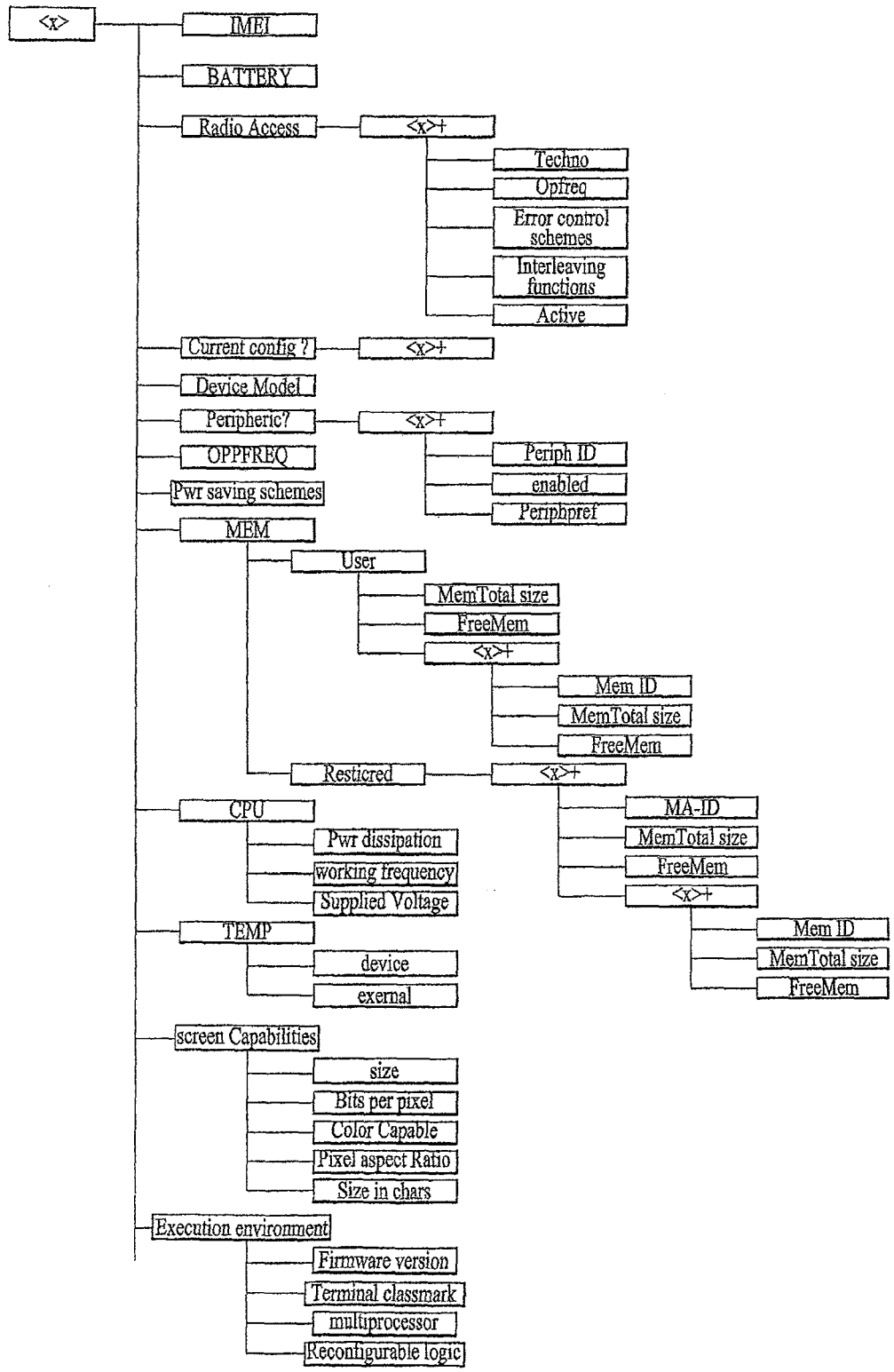
FIG. 10 shows another example of Terminal Profile management objects (MO) in the form of notes in a logical hierarchy (tree) structure.

FIG. 10 (which shows some additional nodes compared to FIG. 6) shows some additional exemplary parameters for a Terminal Profile, and each node can be described as follows (Note: Only those nodes not shown in FIG. 6 are described):

/<X>/Radio Access

This interior node acts as a placeholder for all the information regarding the compliance with specific access technology.

/<X>/Radio Access/<x>

This interior node acts as a placeholder for all the information regarding the compliance with specific access technology, all the technologies compliant with the device will be listed under this node /<X>/Radio Access/<x>/techno This leaf node specifies the name of the technology (e.g. .GSM, UMTS, GPRS, WiFi . . . )

/<X>/Radio Access/<x>/freq

This leaf node specifies the frequencies used for this technology

/<X>/Radio Access/<x>/Error control schemes

This leaf node specifies the error control scheme used for this technology

/<X>/Radio Access/<x>/interleaving function

This leaf node specifies the interleaving function associated with this technology

/<X>/CPU

This internal node acts as a placeholder for information regarding the device's CPU /<X>/CPU/Pwr dissipation This leaf node specifies the power consumption of the device in mW /<X>/CPU/Working frequency
This leaf node specifies the CPU frequency
/<X>/CPU/Supplied Voltage
This leaf node specifies the current voltage supply (in terms of mV)
/<X>/SCREENCAPABILITIES
This interior node acts as a placeholder for information regarding the device screen capabilities such as size and definition
/<X>/SCREENCAPABILITIES/Size
This leaf node specifies the device screen size in pixel, composed of the screen width and height (e.g. 320.times.200)
/<X>/SCREENCAPABILITIES/Bits Per Pixel
This leaf node specifies the number of bits of colour or greyscale information per pixel, related to the number of colours or shades of gray the device can display. (e.g. "2", "8")
/<X>/SCREENCAPABILITIES/Color capable
This leaf node specifies whether the device's display supports colour.
/<X>/SCREENCAPABILITIES/Pixel aspect ratio
This leaf node specifies the ratio of pixel width to pixel height (e.g. 1.times.2)
/<X>/SCREENCAPABILITIES/Size in chars
This leaf node specifies size of the device's screen in units of characters, composed of the screen width and screen height. The device's standard font should be used to determine this property's value. (Number of characters per row) .times.(Number of rows). In calculating this attribute use the largest character in the device's default font. (e.g., 12.times.4, 16.times.8)
/<X>/ExecutionEnvironment/
This interior node acts as a placeholder for information regarding the device execution environment.
/<X>/ExecutionEnvironment/FIRMWARE
This leaf node specifies the version of the installed firmware
/<X>/ExecutionEnvironment/Terminal classmark
This leaf node specifies the classmark of the terminal. This classmark represent the terminal capabilities for reconfigurability: classmark 1 represent a non-reconfigurable equipment, classmark 2 represent a reconfigurable equipment, while classmark 3 represent a dynamically reconfigurable equipment.
/<X>/ExecutionEnvironment/multiprocessor
This leaf node specifies the potential multiprocessor features of the terminal. It is indicated with a Boolean, "true" if the device support any multiprocessor feature, "false" in other cases.
/<X>/ExecutionEnvironment/Reconfigurable logic
This leaf node specifies the potential reconfigurable logic capability of the terminal. It is indicated with a Boolean, "true" if the device has this capability, "false" in other cases.

(8) Reconfigured Application and Service Profile

Figure 11:
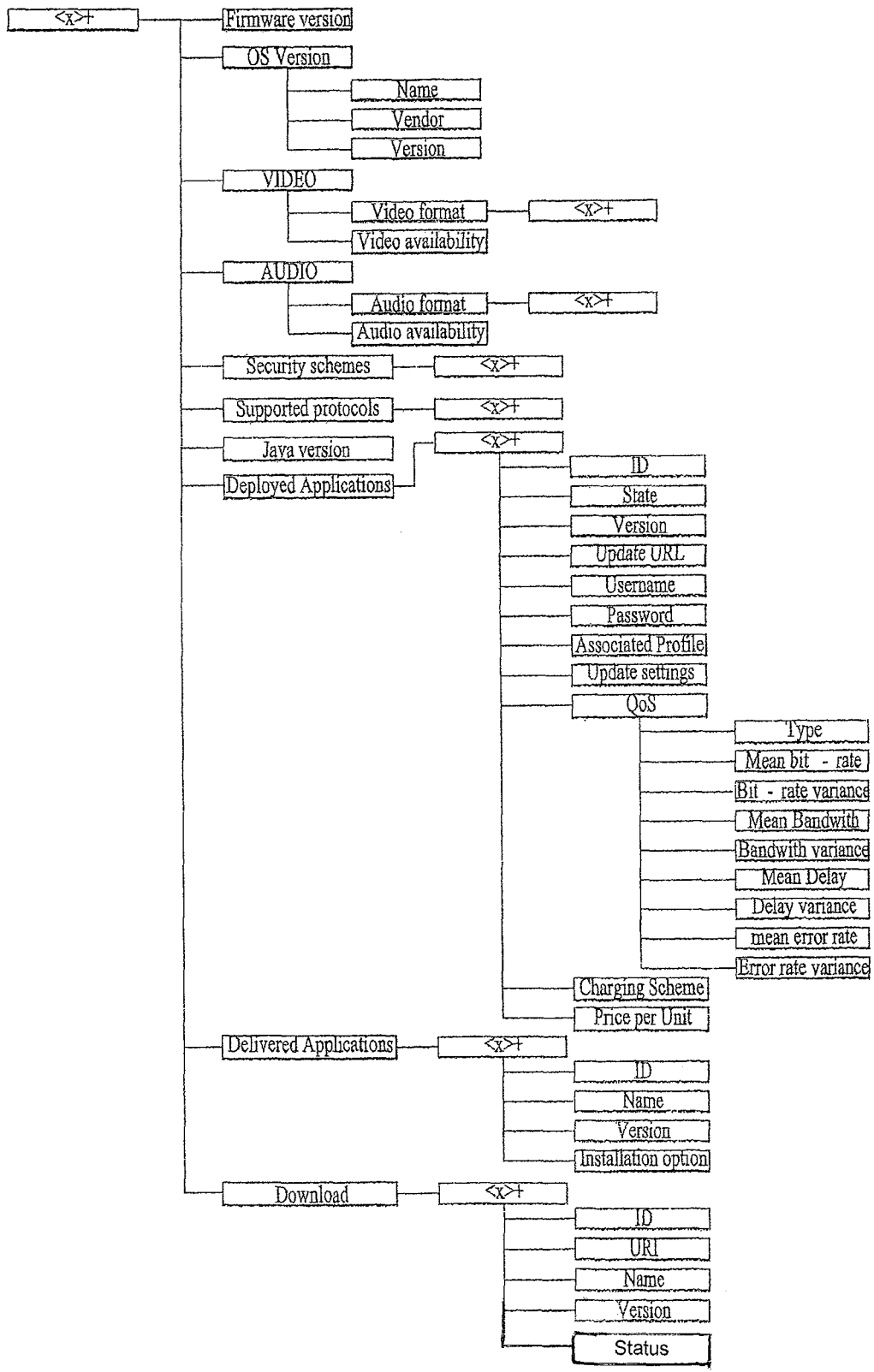
FIG. 11 shows another example of Application and Service Profile management objects (MO) in the form of notes in a logical hierarchy (tree) structure.

FIG. 11 (which shows some additional nodes compared to FIG. 7) shows some additional exemplary parameters for an Application/Service Profile, and each node can be described as follows (Note: Only those nodes not shown in FIG. 7 are described):

/<X>/VIDEO
This interior node acts as a placeholder for the information regarding video on the device (supported codec, and will of the user to receive video or not)
/<X>/VIDEO/Video Format
This interior node acts as a placeholder for the information regarding video formats supported by the device
/<X>/VIDEO/Video Format/<x>
This interior node acts as a placeholder for the information regarding video formats supported by the device
/<X>/VIDEO/Video Availability
This leaf node specifies whether the user would like to receive video or not. The value is a Boolean, it would be "true" if the user wants to receive video, "false" if not.
/<X>/AUDIO
This interior node acts as a placeholder for the information regarding audio on the device (supported codec, and will of the user to receive audio or not)
/<X>/AUDIO/Audio Format
This interior node acts as a placeholder for the information regarding audio formats supported by the device
/<X>/AUDIO/Audio Format/<x>
This interior node acts as a placeholder for the information regarding audio formats supported by the device
/<X>/AUDIO/Audio Availability
This leaf node specifies whether the user would like to receive audio or not. The value is a Boolean, it would be "true" if the user wants to receive audio, "false" if not.
/<X>/Deployed Applications/
This interior node acts as a placeholder for the information regarding all the applications deployed on the device.
/<X>/Deployed Applications/<x>
This interior node acts as a placeholder for the information regarding all the applications deployed on the device.
/<X>/Deployed Applications/QoS
This interior node acts as a placeholder for all the information regarding the QoS for this application.
/<X>/Deployed Applications/QoS/Type
This leaf node specifies basic QoS information, indicating what kind of application it is (e.g. voice, audio, video, data, . . . ).
/<X>/Deployed Applications/QoS/Mean bit-rate
This leaf node specifies that average data rate generated by the application.
/<X>/Deployed Applications/Bit-rate variance
This leaf node specifies the variance of bit-rate. For constant rate it value would be 0, any other value for variable bit rate application
/<X>/Deployed Applications/QoS/Mean bandwidth
This leaf node specifies the average bandwidth the application will require.
/<X>/Deployed Applications/QoS/Bandwith Variance
This leaf node specifies a range within which the application can still operate. For guaranteed min bandwidth, the value would be 0.
/<X>/Deployed Applications/QoS/Mean Delay
This leaf node specifies the average end-to-end transfer delay.
/<X>/Deployed Applications/QoS/Delay Variance
This leaf node specifies the jitter or delay variation tolerance.
/<X>/Deployed Applications/QoS/Mean error rate
This leaf node specifies the average error rate the application can preferably handle.
/<X>/Deployed Applications/QoS/Error rate variance
This leaf node specifies the absolute max error rate beyond which application will crash.
/<X>/Deployed Applications/Charging Scheme
This leaf node specifies the charging scheme (i.e. volume/time) it is being offered on.
/<X>/Deployed Applications/Price per unit
This leaf node specifies the application price per unit (e.g. /sec, /kb . . . )

/<X>/Delivered Applications
This interior node acts as a placeholder for the information regarding all the applications delivered (but not deployed) on the device.
/<X>/Delivered Applications/<x>
This interior node acts as a placeholder for the information regarding all the applications delivered (but not deployed) on the device.
<X>/Delivered Applications/<x>/ID
This leaf node specifies the application ID
/<X>/Delivered Applications/<x>/Name
This leaf node specifies the application human readable name
/<X>/Delivered Applications/<x>/Version
This leaf node specifies the application version
/<X>/Delivered Applications/<x>/Installation option
This leaf node specifies if there are specific installation options (platform specific). The value would be "true" if there are options, "false" if not.
/<X>/Download/
This interior node acts as a placeholder for the information regarding the application that can be downloaded, or are being downloaded, or have just been downloaded.
/<X>/Download/<x>
This interior node acts as a placeholder for the information regarding the application that can be downloaded, or are being downloaded, or have just been downloaded.
/<X>/Download/<x>/ID
This leaf node specifies the application ID
/<X>/Download/<x>/URI
This leaf node specifies the URI of the downloadable application.
/<X>/Download/<x>/Name
This leaf node specifies the application human readable name
/<X>/Download/<x>/Version
This leaf node specifies the application version
/<X>/Download/<x>/Status
This leaf node specifies the status of the download. The values will be: Idle/start, failed, progressing, completed.

(9) Reconfigured Network Profile

Figure 12:
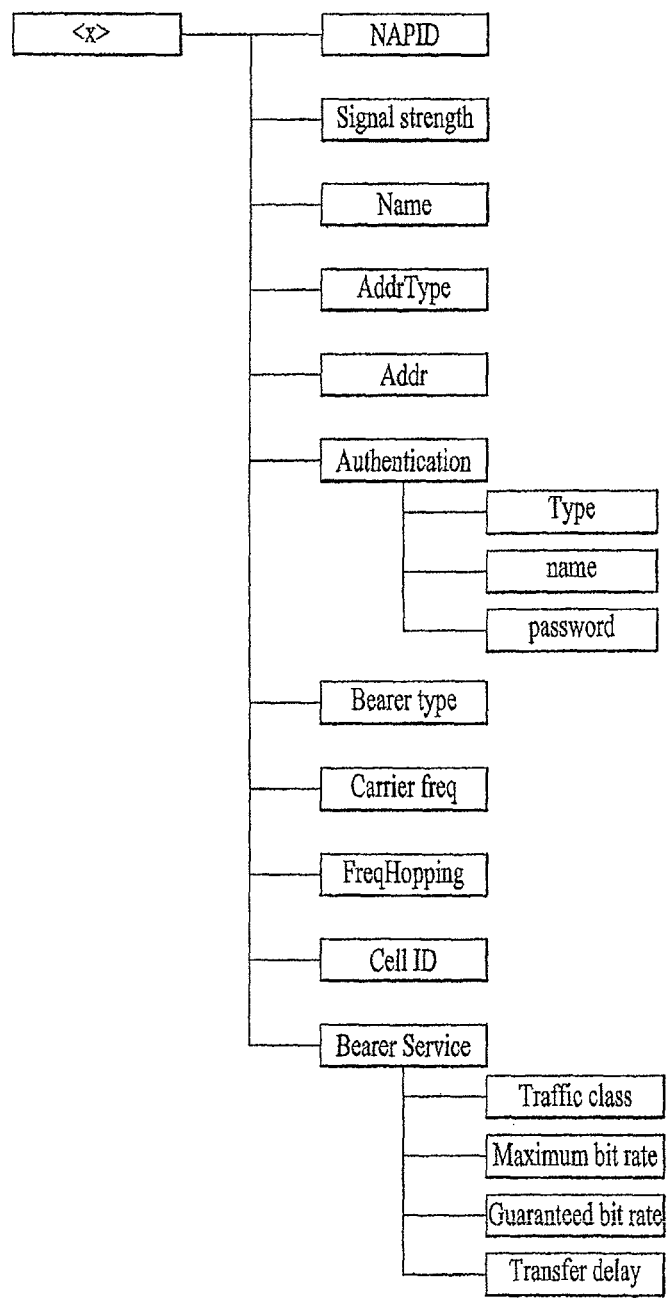
FIG. 12 shows another example of Network Profile management objects (MO) in the form of notes in a logical hierarchy (tree) structure.

FIG. 12 (which shows some additional nodes compared to FIG. 8) shows some additional exemplary parameters for a Network Profile, and each node can be described as follows (Note: Only those nodes not shown in FIG. 8 are described):

/<X>/NAPID
This leaf node specifies the ID of the network access point.
/<X>/Signalstrength
This leaf node specifies the strength of the download signal received by the device.
/<X>/Name
This leaf node specifies a human readable name for the access point.
/<X>/Addrtype
This leaf node specifies the type of NAP address supplied in the Addr field (e.g. IPv4, IPv6, E164, APN . . . ).
/<X>/Addr
This leaf node specifies the address of the network access point.
/<X>/Authentication
This interior Node acts as a placeholder for information regarding authentication.
/<X>/Authentication/type
This leaf node specifies the type of authentication used by the NAP (e.g. PAP, CHAP, MD5 . . . ).
/<X>/Authentication/name
This leaf node specifies the name credential for authentication.
/<X>/Authentication/password
This leaf node specifies the password credential for authentication.
/<X>/Bearer Type
This leaf node specifies the bearer type for this NAP.
/<X>/Carrier Freq
This leaf node specifies the carrier frequency used with this NAP.
/<X>/FreqHopping
This leaf node specifies the frequency hopping list for this NAP.
/<X>/Cell ID
This leaf node specifies the cell ID for this NAP.
/<X>/Bearer Service
This interior Node acts as a placeholder for information regarding bearer service.
/<X>/Bearer Service/Traffic class
This leaf node specifies the Traffic class (e.g. "conversational" or "streaming").
/<X>/Bearer Service/Maximum bit rate
This leaf node specifies the number of bits delivered by RAN within a period of time divided by the duration of the period. The maximum bit rate is the upper limit a user or application can accept or provide.
/<X>/Bearer Service/Guaranteed bit rate
This leaf node specifies the guaranteed number of bits delivered at within a period of time (provided that there is data to deliver), divided by the duration of the period.
/<X>/Bearer Service/Transfer delay
This leaf node specifies the maximum delay for all delivered Service Data Units during the lifetime of a bearer service, where delay is defined as the time from a request to transfer to its delivery.

As described above, the various exemplary embodiments of the present invention relate to managing contextual information for wireless communications. Contextual information may refer to information related to radio access technologies, terminal capabilities, user preferences, applications and/or services provided on the terminal, and the like. Such contextual information needs to be managed and handled effectively and efficiently. This is achieved by managing the contextual information in terms of management objects (MOs) using device management (DM) protocol support.

The various features and concepts described herein may be implemented in software, hardware, or a combination thereof. For example, a computer program (that is executed in a computer, a terminal or a network device) for managing contextual information may comprise a program code section for performing the various tasks. Similarly, a software tool (that is executed in a computer, a terminal or a network device) for managing contextual information may comprise program code portions for performing various tasks.

The parameters (i.e., management objects (MOs)) related to various profiles (e.g., terminal profile, user profile, service profile, etc.) are compatible with various types of technologies and standards.

Also, certain concepts described herein are related to various types of standards, such as ISO/IEC, ETSI, OMA, 3GPP, GSM, IEEE and the like. For example, the reconfiguration concepts described herein relate to the so-called self-organizing network (SON) technologies of the 3GPP (LTE/SAE) standard, as well as the so-called device management (DM) technologies of the OMA standard.

It can be understood that the above exemplary standards are not intended to be limited, as other related standards and technologies would also be applicable to the various features and concepts described herein.

INDUSTRIAL APPLICABILITY

The features and concepts herein are applicable to and can be implemented in various types of user devices (e.g., mobile terminals, handsets, wireless communication devices, etc.) and/or network entities that can be con Figured or recon Figured to support different types of air interfaces, protocols, and applications used in radio communications, such as, cellular, fixed, wireless local area and broadcast systems.

As the various concepts and features described herein may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within such scope or equivalents thereof are therefore intended to be embraced by the appended claims

The invention claimed is:

1. A method for managing contextual information for a wireless communication, the method comprising:
receiving, by a terminal from a network server, a retrieve request for profile information stored in at least one management object related to the contextual information; and
providing, by the terminal to the network server, the requested profile information,
wherein the at least one management object includes a terminal profile that at least specifies a memory allocation and allows a service provider to gain access, and a reconfigured terminal profile that allows the at least one management object to be extended for a new service provider, and
wherein the reconfigured terminal profile specifies a name of at least one access technology, and an error control scheme used for the at least one access technology.

2. The method of claim 1, wherein the reconfigured terminal profile further specifies frequencies used for the at least one access technology.

3. The method of claim 1, wherein the reconfigured terminal profile further specifies an interleaving function associated with the at least one access technology.

4. The method of claim 1, wherein the terminal profile at least identifies memory resources restricted for use by the terminal.

5. The method of claim 1, wherein the terminal profile at least identifies memory resources restricted for use by an operator or a manufacturer.

6. The method of claim 1, wherein the at least one management object further includes a user profile that at least specifies privacy settings and preferences.

7. The method of claim 1, wherein the at least one management object further includes an application and service profile that at least specifies quality of service parameters.

8. The method of claim 1, wherein the at least one management object further includes a network profile that at least specifies bearer service parameters.

9. The method of claim 1, wherein the at least one management object further includes a security profile that at least specifies security parameters.

10. A terminal configured to manage contextual information for a wireless communication, the terminal comprising:
a memory configured to store at least one management object related to the contextual information;
a network interface configured to receive signals from a network server and transmit signals to the network server; and
a processor operatively connected to the memory and the network interface and configured to:
receive a retrieve request for profile information stored in the at least one management object through the network interface, and
provide the requested profile information through the network interface,
wherein the at least one management object includes a terminal profile that at least specifies a memory allocation and allows a service provider to gain access, and a reconfigured terminal profile that allows the at least one management object to be extended for a new service provider, and
wherein the reconfigured terminal profile specifies a name of at least one access technology, and an error control scheme used for the at least one access technology.

11. The terminal of claim 10, wherein the reconfigured terminal profile further specifies frequencies used for the at least one access technology.

12. The terminal of claim 10, wherein the reconfigured terminal profile further specifies an interleaving function associated with the at least one access technology.

13. The terminal of claim 10, wherein the terminal profile at least identifies memory resources restricted for use by the terminal.

14. The terminal of claim 10, wherein the terminal profile at least identifies memory resources restricted for use by an operator or a manufacturer.

15. The terminal of claim 10, wherein the at least one management object further includes a user profile that at least specifies privacy settings and preferences.

16. The terminal of claim 10, wherein the at least one management object further includes an application and service profile that at least specifies quality of service parameters.

17. The terminal of claim 10, wherein the at least one management object further includes a network profile that at least specifies bearer service parameters.

18. The terminal of claim 10, wherein the at least one management object further includes a security profile that at least specifies security parameters.

* * * * *